H. K. REEVES.
PARACHUTE.
APPLICATION FILED APR. 23, 1919.

1,310,839.

Patented July 22, 1919.

Herbert Kempson Reeves
INVENTOR by Laurence Laugur
Attorney

UNITED STATES PATENT OFFICE.

HERBERT K. REEVES, OF LONDON, ENGLAND.

PARACHUTE.

1,310,839.     Specification of Letters Patent.     Patented July 22, 1919.

Application filed April 23, 1919. Serial No. 292,047.

*To all whom it may concern:*

Be it known that I, HERBERT KEMPSON REEVES, a subject of the King of Great Britain, residing at London, in the county of Middlesex, England, have invented new and useful Improvements Relating to Parachutes, of which the following is a specification.

This invention has reference to parachutes adapted to be carried by aeroplane or aerial craft to afford means for the descent of the occupants therefrom when necessary.

More particularly the invention relates to parachutes of the kind which are carried normally in a case or container and launched therefrom by the application of the load.

The primary object of the invention is to provide means whereby a parachute may be so carried by an aerial craft that it shall not interfere with the streamline formation of the machine or its capabilities and yet be capable of being launched rapidly in an emergency without risk of fouling any part of the aerial craft.

With this object in view and such others as may hereinafter appear or are incidental thereto my invention in its broadest aspect may be said to consist in the provision of means for supporting a parachute within the fuselage or body of an aeroplane or aerial craft in such a manner that the application of the load shall operate to abstract the nested parachute from the fuselage or body before the weight of the load is exerted on the parachute rigging.

More specifically regarded the invention consists in providing the fuselage of an aeroplane or the like with a support or supports adapted to retain normally a packed or nested parachute within the fuselage and means coöperating with the main suspension or load rope of the parachute whereby upon application of the load the weight thereof operates to rupture or displace said support or supports to provide an unobstructed passage for the release or abstraction of parachute from the fuselage the weight of the load being then exerted upon the rigging of the parachute to effect the launching and subsequent complete expansion of the parachute body.

In one embodiment of the invention this may be effected by utilizing the space between the transverse struts of the fuselage structure as a recess or chamber in which the packed parachute may be housed and retaining the packed parachute in said recess by appropriate supports which may for example be of wood or other suitable substance or material adapted to be more or less readily fractured, broken or displaced.

The main suspension rope or load rope of the parachute to which of course the occupant of the machine is attached through the usual harness is provided with a member or members which positively connect it with the aforesaid support or supports in such a manner that when the load is applied the weight thereof is first exerted through the aforementioned connecting members upon the support or supports thereby breaking or displacing it or them and allowing the parachute in its case or container to fall from the recess or chamber clear of the fuselage until arrested by the cord or the like which secures the case or container to the fuselage. As the load falls its weight is then exerted upon the rigging of the parachute thereby launching the parachute body from its case or container as will be well understood by those familiar with the type of parachute hereinbefore referred to.

Preferably the packed parachute is prevented from shifting within the aforesaid recess by providing struts of appropriate material so shaped as to conform more or less to the contour of the packed parachute and some of said struts may also perform the function of bracing the fuselage structure as it will be apparent that the usual diagonally arranged wire stays between the lower longerons must be removed to afford an unobstructed passage for the ingress and egress of the packed parachute.

Where in connection with this invention parachutes are employed of the kind which when nested form an approximately circular package they are preferably arranged in the aforesaid recess edgewise, an arrangement which is advantageous when parachutes are carried both for the pilot and the observer as they may be placed side by side edgewise thus economizing space.

In order that the invention may be readily understood and carried into effect I will now proceed to describe the same in detail with reference to the accompanying drawings in which.

Figure 1:
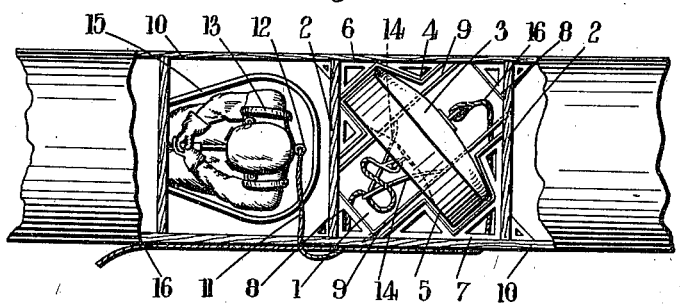
Figure 1 represents a top plan view of a portion of an aeroplane fuselage showing the improved parachute mounting and launching device as applied to a single-seater aeroplane a portion of the fabric being removed to more clearly illustrate the disposition of the parts.

Referring more particularly to Fig. 1 in that embodiment of my invention there illustrated the space 1 between the transverse struts, 2, 2 of the fuselage structure is utilized as a recess or chamber in which the packed or nested parachute 3 is housed. Preferably the parachute is arranged in said recess edgewise and diagonally of the recess as by this means space is economized.

Figure 3:
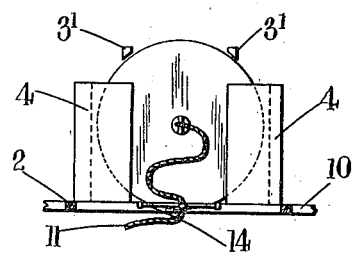
Fig. 3 is an elevation of a portion of Fig. 2 taken along the line a—a and illustrating diagrammatically the method of supporting the parachute within the fuselage.

The parachute is retained in the position shown by stops 3' (Fig. 3) and channel shaped sheaths 4 and 5 which are supported by the struts 6 and 7 which also serve to impart the requisite rigidity to the structure as it will be understood that at least some of the diagonal wire stays usually employed between the longerons must be removed to permit the recess being used for housing the parachute. Other struts 8 are also preferably provided to strengthen the remaining corners of the recess.

The parachute 3 being placed in position two light wooden stringers 9 are arranged beneath it and tacked or otherwise secured in or on the longerons 10 and transverse struts 2. The main suspension rope or load rope 11 of the parachute 3 is attached to the usual harness 12 worn by the aviator 13 and is provided with two positively attached members 14 preferably of rope wire or like flexible material which are provided with eyes engaging the stringers 9. On reference to Fig. 3 it will be seen that the main rope 11 is so arranged that between the parachute 3 and connecting members 14 a certain amount of slack is provided the objective of which will be apparent when the operation of our improved device is considered and which I will now proceed to describe.

The parts being arranged as illustrated in Fig. 1 the pilot in case of emergency or being otherwise desirous of making a descent throws himself from the cockpit 15 of the machine whereupon his weight will be exerted through the main suspension rope 11 upon the members 9 causing them to snap. The packed parachute 3 being thus deprived of its supporting means is released and abstracted and falls *en masse* clear of the aeroplane until arrested by the rope 16 by which its case or container is secured to the aircraft such as by means of a lug on the chassis socket. When the rope 16 is fully extended the weight of the pilot will be transferred through the main suspension rope 11 to the parachute which is then launched.

Figure 2:
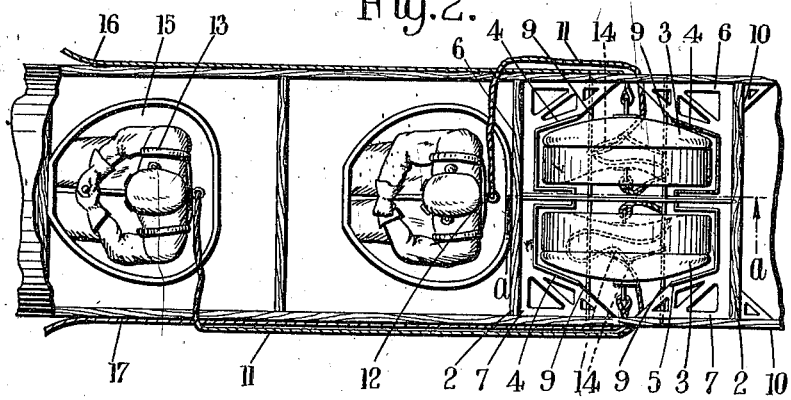
Fig. 2 illustrates a top plan view similar to Fig. 1 but showing our invention applied to a two-seater aeroplane.

In Fig. 2 I have illustrated a portion of a two-seater aeroplane in which a parachute for the observer as well as one for the pilot is housed in the aforesaid recess in the fuselage. In this arrangement the parachutes 3 are mounted edgewise side by side in the recess and are supported in a manner similar to that described with reference to Fig. 1 and as the operation is in all respects similar the same will be readily understood without further description although it may be as well to here point out that to provide for adequate clearance between the two parachutes or their containers or between one container and another when abstracted in sequence the rope 17 by means of which the observer's parachute is attached to the aeroplane should be shorter than the rope 16 by means of which the pilot's parachute is attached so that when the pilot drops—as he should do last—his parachute will descend to a lower level before opening thus obviating the risk of fouling the observer's parachute container.

It will be observed that under this invention but little structural alteration to the fuselage is required as it is only necessary to remove the fabric on the under surface of the fuselage between the two transverse stays selected, remove the lower diagonal wire stays, arrange the aforesaid shaped struts in position within the recess so disclosed, mount the nested parachute within said recess and place the supporting members in position.

The main suspension rope or load rope of the parachute is connected to said supports in the manner above described and led along the outside of the fuselage to a convenient position for attachment to the aviator. This done the fabric may if desired be replaced thus inclosing the parachute and protecting it from deleterious atmospheric influences.

In a modification of the invention the parachute may be supported within the aforesaid recess by a hinged door or doors and the main suspension rope so connected thereto or operating therewith that said door or doors will be released to allow the packed parachute to fall clear of the fuselage before any weight is exerted on the parachute rigging.

What I claim and desire to secure by Letters Patent of the United States is:—

1. The combination with an aerial craft, of a parachute resting within the aerial craft, supporting means in said aerial craft on which said parachute rests, a connection from the load to the parachute and to the supporting means, so that when load is applied, said supporting means is rendered inoperative, whereby the parachute is withdrawn from the aerial craft.

2. The combination with an aerial craft of a parachute resting within the aerial craft, a supporting member in said aerial craft, on which member said parachute rests, a load-rope connected to the parachute and to the supporting member, so that when load is applied, said supporting member is rendered inoperative, whereby the parachute is withdrawn.

3. The combination with the fuselage of an aerial craft, of a parachute, a container housing said parachute, said container resting within the fuselage, supporting members in said fuselage, on which members said container rests, a load-rope connected to the parachute and to the supporting members, so that when load is applied, said supporting members are rendered inoperative, whereby the parachute and container are withdrawn from the aerial craft.

4. The combination with the fuselage of an aerial craft, of a parachute, a container housing said parachute, said container resting within the fuselage, supporting members in said fuselage, on which members said container rests, a rope connecting the fuselage and the container, rigging secured to said parachute, a load-rope connected to the parachute rigging and to the supporting members, so that when load is applied, said rope will displace said supporting members to provide an unobstructed passage for the abstraction of the container and parachute from the fuselage, this abstraction putting the container rope under tension, the weight of the load being then exerted upon the rigging of the parachute to effect the launching thereof.

HERBERT K. REEVES.

Copies of this patent may be obtained for five cents each, by addressing the "Commissioner of Patents, Washington, D. C."